(12) United States Patent
van Diggelen (10) Patent No.: US 7,522,098 B2
(45) Date of Patent: Apr. 21, 2009

(54) METHOD AND APPARATUS FOR VALIDATING A POSITION IN A SATELLITE POSITIONING SYSTEM USING RANGE-RATE MEASUREMENTS

(75) Inventor: Frank van Diggelen, San Jose, CA (US)

(73) Assignee: Global Locate, Inc., San Jose, CA (US)

( * ) Notice: Subject to any disclaimer, the term of this patent is extended or adjusted under 35 U.S.C. 154(b) by 14 days.

(21) Appl. No.: 11/142,824

(22) Filed: Jun. 1, 2005

(65) Prior Publication Data

US 2006/0273954 A1 Dec. 7, 2006

(51) Int. Cl.
*H01S 1/00* (2006.01)
(52) U.S. Cl. .................................. 342/357.02
(58) Field of Classification Search ...............
342/357.01–357.17
See application file for complete search history.

(56) References Cited

U.S. PATENT DOCUMENTS

| | | | |
|---|---|---|---|
| 5,488,378 A | | 1/1996 | Colley |
| 5,552,794 A | * | 9/1996 | Colley et al. ........... 342/357.05 |
| 6,078,284 A | | 6/2000 | Levanon |
| 6,107,959 A | | 8/2000 | Levanon |
| 6,118,808 A | | 9/2000 | Tiemann et al. |
| 6,137,441 A | | 10/2000 | Dai et al. |
| 6,327,534 B1 | * | 12/2001 | Levanon et al. ............. 701/215 |
| 6,772,065 B2 | | 8/2004 | Sanmiya et al. |
| 2002/0050944 A1 | * | 5/2002 | Sheynblat et al. ...... 342/357.06 |
| 2003/0156058 A1 | * | 8/2003 | Edwards et al. ......... 342/357.04 |
| 2006/0111840 A1 | * | 5/2006 | van Diggelen .............. 701/215 |

OTHER PUBLICATIONS

*International Search Report* mailed Nov. 24, 2006 for PCT Application No. PCT/US2006/020568.
*Written Opinion* mailed Nov. 24, 2006 for PCT Application No. PCT/US2006/020568.

\* cited by examiner

*Primary Examiner*—Thomas H Tarcza
*Assistant Examiner*—Nga X Nguyen
(74) *Attorney, Agent, or Firm*—McAndrews Held & Malloy Ltd.

(57) ABSTRACT

Method and apparatus for validating an initial position in a satellite positioning system using range-rate measurements is described. In one example, range-rate measurements are obtained at the remote receiver with respect to a plurality of satellites. Expected range-rates are computed with respect to the plurality of satellites using the initial position. Single differences are computed using the range-rate measurements. Expected single differences are computed using the expected range-rates. Single difference residuals are computed between the single differences and the expected single differences. The single difference residuals are compared to a threshold. The initial position may be deemed valid if the absolute value of each of the single difference residuals is less than or equal to the threshold. A valid initial position may be used to fix the pseudorange integers.

27 Claims, 5 Drawing Sheets

METHOD AND APPARATUS FOR VALIDATING A POSITION IN A SATELLITE POSITIONING SYSTEM USING RANGE-RATE MEASUREMENTS

BACKGROUND OF THE INVENTION

1. Field of the Invention

The present invention relates to satellite positioning systems and, more particularly, to a method and apparatus for validating a position in a satellite positioning system using range-rate measurements.

2. Description of the Background Art

Satellite Positioning System (SPS) receivers use measurements from several satellites to compute position. SPS receivers normally determine their position by computing time delays between transmission and reception of signals transmitted from satellites and received by the receiver on or near the surface of the earth. The time delays multiplied by the speed of light provide the distance from the receiver to each of the satellites that are in view of the receiver. Exemplary satellite positioning systems include the Global Positioning System (GPS), the European GALILEO system, and the Russian GLONASS system.

In GPS, each signal available for commercial use utilizes a direct sequence spreading signal defined by a unique pseudo-random noise (PN) code (referred to as the coarse acquisition (C/A) code) having a 1.023 MHz spread rate. Each PN code bi-phase modulates a 1575.42 MHz carrier signal (referred to as the L1 carrier) and uniquely identifies a particular satellite. The PN code sequence length is 1023 chips, corresponding to a one millisecond time period. One cycle of 1023 chips is called a PN frame or epoch.

GPS receivers determine the time delays between transmission and reception of the signals by comparing time shifts between the received PN code signal sequence and internally generated PN signal sequences. These measured time delays are referred to as "sub-millisecond pseudoranges," since they are known modulo the 1 millisecond PN frame boundaries. If the data bit edges are identified for a particular satellite, then the pseudorange is known modulo the data bit period, for example, 20 ms in the current GPS system. Different satellite navigation systems, and future changes in the GPS system may give different data bit periods. In general, if a pseudorange is known modulo N ms, then we refer to it as a "fractional pseudorange". By resolving the integer number of milliseconds associated with each delay to each satellite, then one has true, unambiguous, pseudoranges. A set of four pseudoranges together with knowledge of absolute times of transmission of the GPS signals and satellite positions in relation to these absolute times is sufficient to solve for the position of the GPS receiver. The absolute times of transmission (or reception) are needed in order to determine the positions of the GPS satellites at the times of transmission and hence to compute the position of the GPS receiver.

Accordingly, each of the GPS satellites broadcasts a model of satellite orbit and clock data known as the satellite navigation message. The satellite navigation message is a 50 bit-per-second (bps) data stream that is modulo-2 added to the PN code with bit boundaries aligned with the beginning of a PN frame. There are exactly 20 PN frames per data bit period (20 milliseconds). The satellite navigation message includes satellite-positioning data, known as "ephemeris" data, which identifies the satellites and their orbits, as well as absolute time information (also referred to herein as "GPS system time") associated with the satellite signal. The GPS system time information is in the form of a second of the week signal, referred to as time-of-week (TOW). This absolute time signal allows the receiver to unambiguously determine a time tag for when each received signal was transmitted by each satellite.

GPS satellites move at approximately 3.9 km/s, and thus the range of the satellite, observed from the earth, changes at a rate of at most ±800 m/s. Absolute timing errors result in range errors of up to 0.8 m for each millisecond of timing error. These range errors produce a similarly sized error in the GPS receiver position. Hence, absolute time accuracy of 10 ms is sufficient for position accuracy of approximately 10 m. Absolute timing errors of much more than 10 ms will result in large position errors, and so typical GPS receivers have required absolute time to approximately 10 milliseconds accuracy or better.

Another time parameter closely associated with GPS positioning is the sub-millisecond offset in the time reference used to measure the sub-millisecond pseudorange. This offset affects all the measurements equally, and for this reason it is known as the "common mode error". The common mode error should not be confused with the absolute time error. As discussed above, an absolute time error of 1 millisecond leads to range errors of up to 0.8 meters while an absolute time error of 1 microsecond would cause an almost unobservable range error of less than 1 millimeter. A common mode error of 1 microsecond, however, results in a pseudorange error of 1 microsecond multiplied by the speed of light (i.e., 300 meters). Common mode errors have a large effect on pseudo-range computations, and it is, in practice, very difficult to calibrate the common mode error. As such, traditional GPS receivers treat the common mode error as an unknown that must be solved for, along with position, once a sufficient number of pseudoranges have been measured at a particular receiver.

Traditionally, the process of resolving the integer portions of the pseudoranges ("integer ambiguity resolution") has traditionally required an initial estimate of receiver position that is close enough to the true receiver position for the integers to be uniquely defined. Notably, an initial position within 150 km of the true position will enable unambiguous resolution of the integers. In some cases, the only choice for an initial position estimate at the receiver is the most recently computed position, which is stored in a position cache. For example, the receiver may be unable to communicate with any external source capable of providing a position estimate (e.g., a cellular telephone network). However, if the receiver has traveled more than 150 kilometers from the last computed position, than the pseudorange integers will not be reliably resolved. If a position is computed using pseudoranges having incorrect integers, the position will be invalid.

Accordingly, there exists a need in the art for a method and apparatus for validating a position in a satellite position system.

SUMMARY OF THE INVENTION

Method and apparatus for locating position of a remote receiver is described. In one embodiment, fractional pseudoranges are measured from the remote receiver to a plurality of satellites. An initial position is obtained at the remote receiver. For example, a recently computed position stored in a position cache of the remote receiver may be selected as the initial position. A position of the remote receiver is computed using the fractional pseudoranges and the initial position. Range-rate measurements are obtained at the remote receiver with respect to the satellites. The computed position is validated using the range-rate measurements.

In another embodiment, fractional pseudoranges from the remote receiver to a plurality of satellites are measured. An initial position is obtained at the remote receiver. For example, a recently computed position stored in a position cache of the remote receiver may be selected as the initial position. Range-rate measurements are obtained at the remote receiver with respect to the plurality of satellites. The initial position is validated using the range-rate measurements. The position of the remote receiver is computed using the fractional pseudoranges and the initial position in response to the initial position being deemed valid. Notably, if the initial position is deemed valid, the initial position may be used to fix the integer portions of the fractional pseudoranges.

BRIEF DESCRIPTION OF DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION OF THE INVENTION

A method and apparatus for validating a position in a satellite positioning system (SPS) using range-rate measurements is described. Those skilled in the art will appreciate that the invention may be used with various types of mobile or wireless devices that are "location-enabled," such as cellular telephones, pagers, laptop computers, personal digital assistants (PDAs), and like type wireless devices known in the art. Generally, a location-enabled mobile device is facilitated by including in the device the capability of processing satellite positioning system (SPS) satellite signals.

Figure 1:
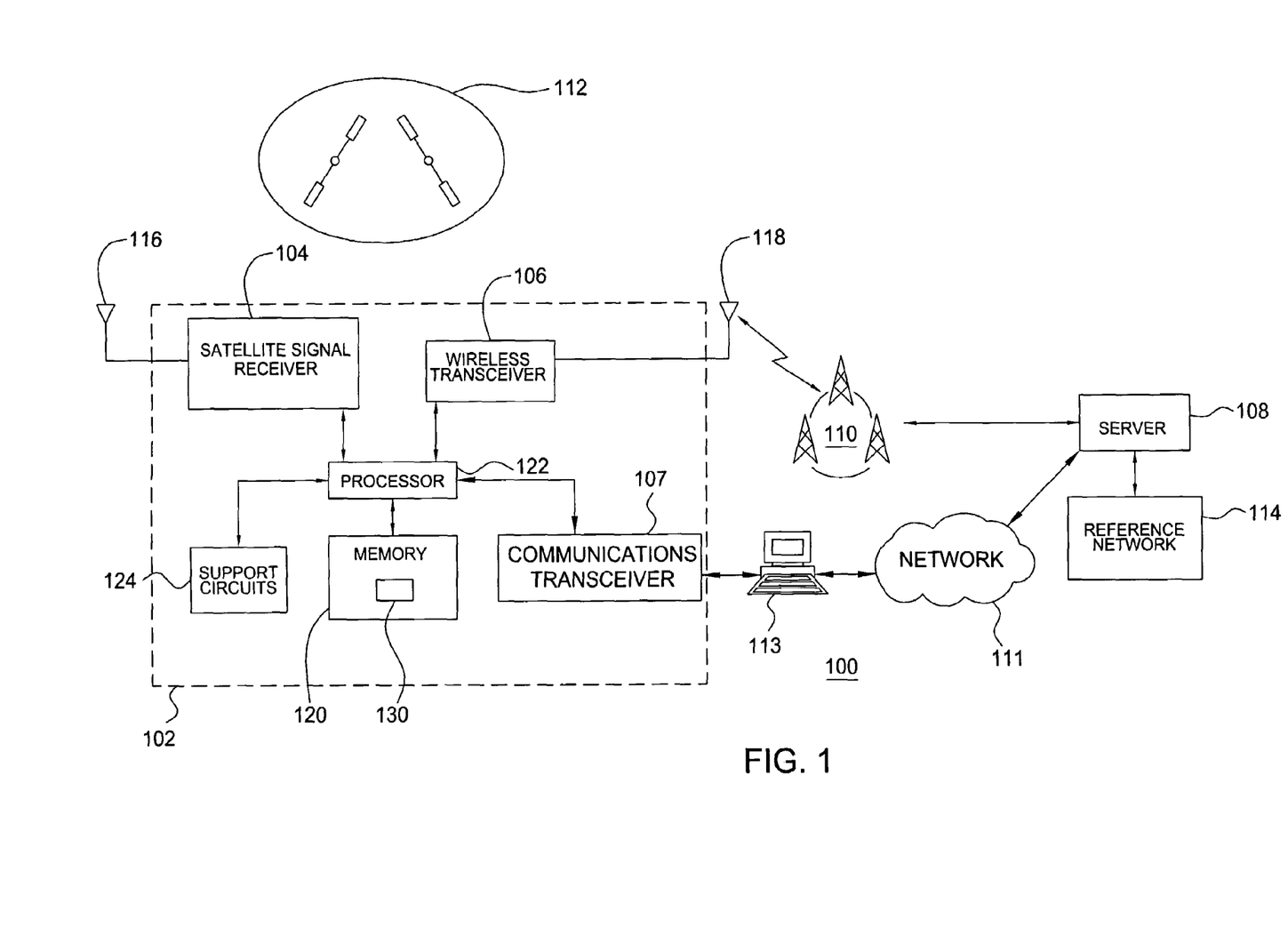
FIG. 1 is a block diagram depicting an exemplary embodiment of a position location system.

FIG. 1 is a block diagram depicting an exemplary embodiment of a position location system 100. The system 100 comprises a remote receiver 102 and a server 108. The remote receiver 102 is configured to receive satellite signals from a plurality of satellites 112 in a constellation of satellites. The remote receiver 102 processes the received signals to produce satellite measurement data (e.g., pseudoranges, range-rate measurements) with respect to the satellites 112. In one embodiment, the remote receiver 102 receives assistance data from the server 108. The remote receiver 102 may communicate with the server 108 via a wireless network 110, a wired network 111, or both. Notably, the remote receiver 102 may be configured for direct communication with the wired network 111 or for indirect communication through a computer 113. The wireless network 110 may comprise any type of wireless network known in the art, such as a cellular telephone network. The wired network 111 may comprise any type of wired network known in the art, such as the Internet.

The remote receiver 102 may use the assistance data to aid in acquisition of the satellite signals and/or to compute position. The assistance data may include satellite position information (e.g., ephemeris data or other type of satellite orbit model), expected code phase, expected Doppler, a pseudorange model, and like type assistance data known in the art, as well as any combination of such data. In one embodiment, the remote receiver 102 computes its own position using the satellite measurement data and the assistance data. Such a configuration is similar to the industry standard "Mobile Station Based" mode, but differs from the standards in that no initial position is required from the server. The management of the initial position by the remote receiver is part of the current invention. In another embodiment, the remote receiver 102 sends the satellite measurement data to the server 108 and the server 108 computes position of the remote receiver (e.g., a mobile station assisted or MS-Assisted configuration).

Although the position location system 100 is shown as an Assisted GPS (A-GPS) system having a server, it is to be understood that the remote receiver 102 may operate autonomously without receiving assistance data from the server 108. That is, in another embodiment, there is no communication between the remote receiver 102 and the server 108 and the remote receiver 102 does not receive assistance data. Instead, the remote receiver 102 receives satellite position information by decoding the satellite signals to recover satellite navigation data using a well known decoding process. The remote receiver 102 then computes its own position using the satellite measurement data and the satellite navigation data.

In one embodiment, the remote receiver 102 comprises a satellite signal receiver 104, a wireless transceiver 106, a processor 122, support circuits 124, a communications transceiver 107, and a memory 120. The satellite signal receiver 104 receives satellite signals from the satellites 112 using an antenna 116. The satellite signal receiver 104 may comprise a conventional A-GPS receiver. An exemplary A-GPS receiver is described in commonly-assigned U.S. Pat. No. 6,453,237, issued Sep. 17, 2002, which is incorporated by reference herein in its entirety. The wireless transceiver 106 receives wireless signals from the wireless communication network 110 via an antenna 118. The communications transceiver 107 may comprise a modem or the like for direct communication with the wired network 111, or may comprise a serial transceiver or the like for communicating with the computer 113. Although the remote receiver 102 is shown as having both a wireless transceiver and a communications transceiver, those skilled in the art will appreciate that the remote receiver 102 may be configured with only the wireless transceiver 106 or only the communications transceiver 107. The satellite signal receiver 104, the wireless transceiver 106, and the communications transceiver 107 may be controlled by the processor 122. For purposes of clarity by example, the remote receiver 102 is shown as an assisted-SPS receiver. Those skilled in the art will appreciate, however, that the invention described herein may be used in a conventional autonomous SPS receiver (e.g., a receiver without a wireless transceiver or a communications transceiver).

The processor 122 may comprise a microprocessor, instruction-set processor (e.g., a microcontroller), or like type processing element known in the art. The processor 122 is coupled to the memory 120 and the support circuits 124. The memory 120 may be random access memory, read only memory, removable storage, hard disc storage, or any combination of such memory devices. The memory 120 may be used to store a cache of recently computed positions ("position cache 130"). Various processes and methods described herein may be implemented via software stored in the memory 120 for execution by the processor 122. Alternatively, such processes and methods may be implemented using dedicated hardware, such as an application specific integrated circuit (ASIC), or a combination of hardware and software. The support circuits 124 include conventional cache, power supplies, clock circuits, data registers, I/O circuitry, and the like to facilitate operation of the remote receiver 102.

Satellite navigation data, such as ephemeris for at least the satellites 112, may be collected by a network of tracking stations ("reference network 114"). The reference network 114 may include several tracking stations that collect satellite navigation data from all the satellites in the constellation, or a few tracking stations, or a single tracking station that only collects satellite navigation data for a particular region of the world. An exemplary system for collecting and distributing ephemeris is described in commonly-assigned U.S. Pat. No. 6,411,892, issued Jun. 25, 2002, which is incorporated by reference herein in its entirety. The reference network 114 may provide the collected satellite navigation data to the server 108.

Figure 2:
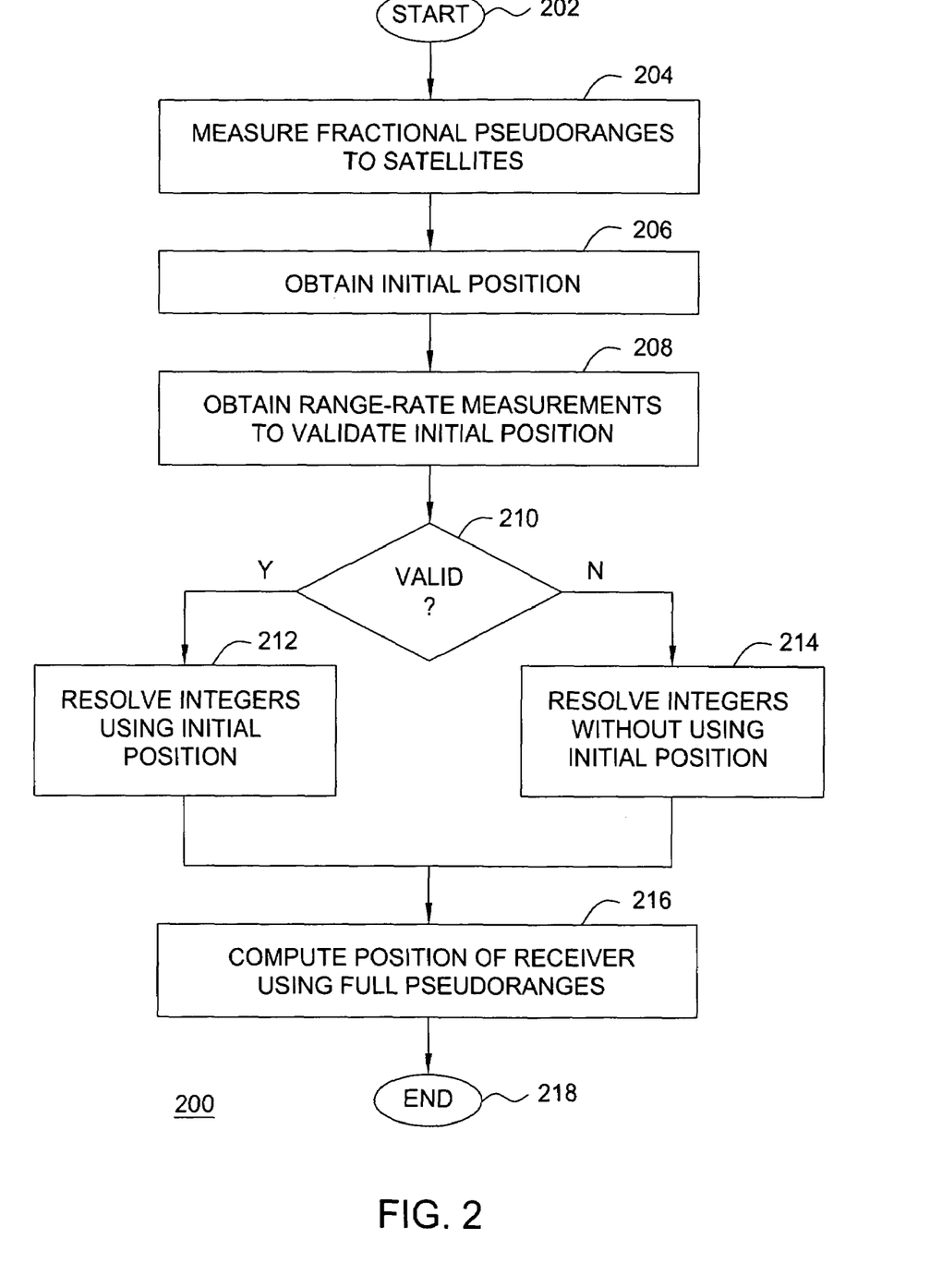
FIG. 2 is a flow diagram depicting an exemplary embodiment of a method for locating position of a remote receiver in accordance with the invention.

FIG. 2 is a flow diagram depicting an exemplary embodiment of a method 200 for locating position of a remote receiver in accordance with the invention. The method 200 begins at step 202. At step 204, fractional pseudoranges are measured from the remote receiver 102 to a plurality of satellites (the satellites 112). In one embodiment, fractional pseudoranges are obtained by measuring sub-millisecond pseudoranges at the remote receiver 102. In another embodiment, fractional pseudoranges are obtained by synchronizing to the navigation data bit edges (e.g., in GPS, the navigation data bit edges occur every 20 milliseconds). By identifying the navigation data bit edges, the pseudoranges may be determined modulo the navigation data bit period (e.g., modulo 20 milliseconds in GPS to provide sub-20 millisecond pseudoranges). In yet another embodiment, fractional pseudoranges are obtained from sub-ms pseudoranges for some satellites, and modulo the data bit period for other satellites. At step 206, an initial position of the remote receiver 102 is obtained. For example, the remote receiver 102 may store one or more recently computed positions in the memory 120 (e.g., the position cache 130). The most recent of such positions may be selected as an initial position. At step 208, range-rate measurements are obtained at the remote receiver 102 to validate the initial position obtained at step 206. Exemplary processes for validating a position using range-rate measurements are described below with respect to FIGS. 3 and 4.

At step 210, a determination is made as to whether the initial position is valid. The validation process performed at step 210 is used to determine if the initial position is within 150 km of the actual position of the remote receiver (e.g., one half an epoch of a PN code). If so, the initial position may be used to fix the integer portions of the fractional pseudoranges. If not, the initial position cannot be used to unambiguously fix the integer portions of the fractional pseudoranges. Thus, if at step 210 the initial position is deemed to be valid, the method 200 proceeds to step 212. At step 212, the pseudorange integers are resolved using the initial position obtained at step 206. If the initial position is deemed to be invalid at step 210, the method 200 proceeds to step 214. At step 214, the pseudorange integers are resolved without using the initial position. An exemplary integer ambiguity resolution process that may be performed without the need on an initial position is described in commonly-assign U.S. Pat. No. 6,734,821, issued May 11, 2004, which is incorporated by reference herein in its entirety. However, as described in U.S. Pat. No. 6,734,821, in order to resolve the integers without an initial position to within 150 kilometers, more than four fractional pseudorange measurements are required. In contrast, the integers may be fixed using the initial position at step 212 using only three or four pseudoranges. In some cases, the remote receiver 102 may not be capable of receiving more than four satellite signals to compute pseudoranges (e.g., low signal-to-noise ratio environments). Thus, it is advantageous to resolve the pseudorange integers using the initial position, if possible, at step 212.

At step 216, position of the remote receiver 102 may be computed using the full pseudoranges and a navigation model in a well-known manner. Notably, in the general satellite navigation problem, there are nine unknowns:

Three position unknowns: x, y, z
Three velocity unknowns: $\dot{x}$, $\dot{y}$, $\dot{z}$
Three clock unknowns: $t_C$, $t_S$, $f_C$ where $t_C$ is the common mode timing error (usually a sub-millisecond value in GPS), $t_S$ is the absolute time tag error, and $f_C$ is the frequency error in a local oscillator within the remote receiver 102. One or more of the variables may be known or estimated based on a-priori information (e.g., $t_S$ may known if the remote receiver 102 is calibrated to precise GPS time). One or more of the unknown variables may be solved for the pseudoranges and satellite orbit/clock data (e.g., ephemeris) in a well-known manner.

Figure 4:
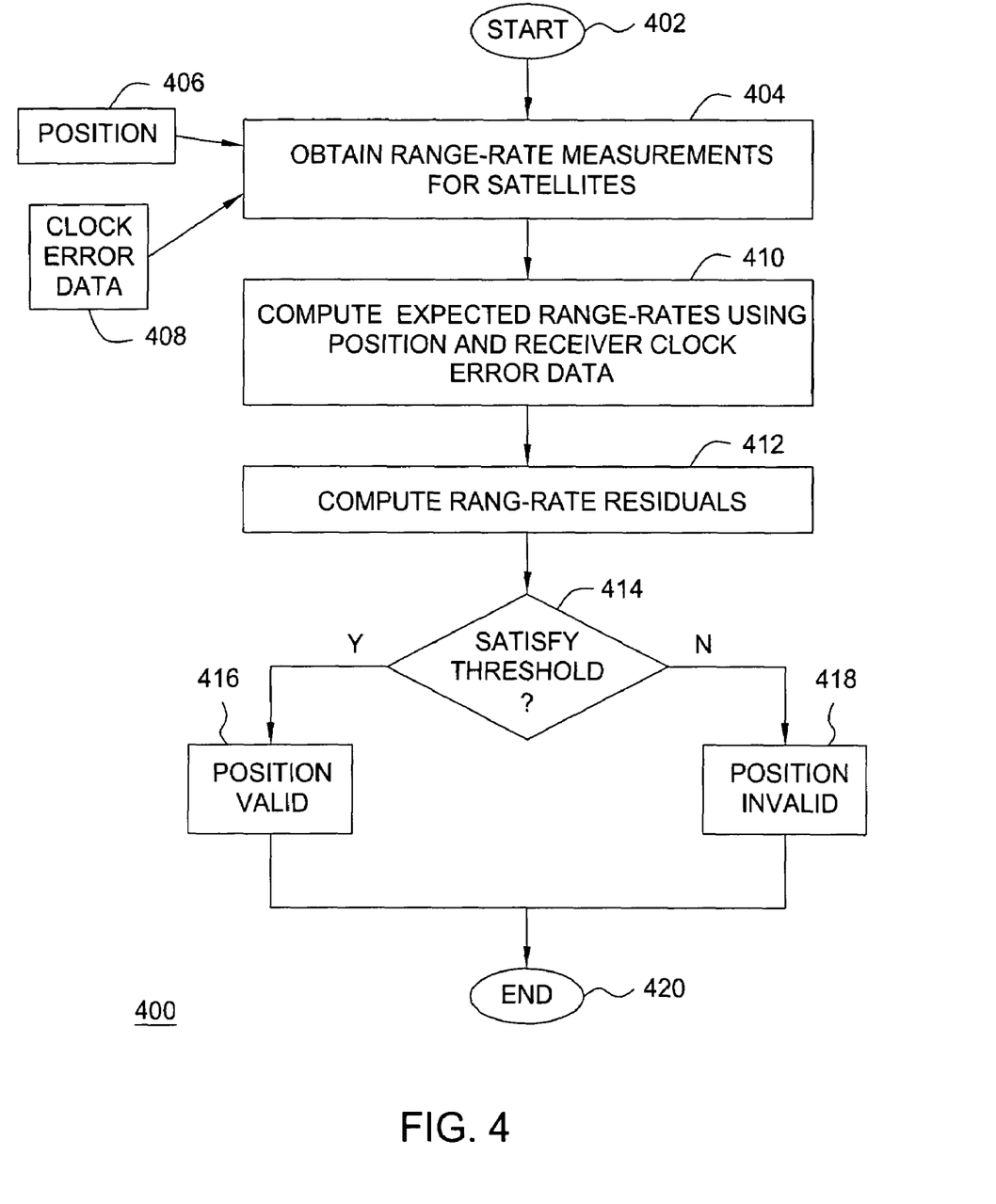
FIG. 4 is a flow diagram depicting another exemplary embodiment of a method 400 for validating a position at a remote receiver in accordance with the invention.
Figure 5:
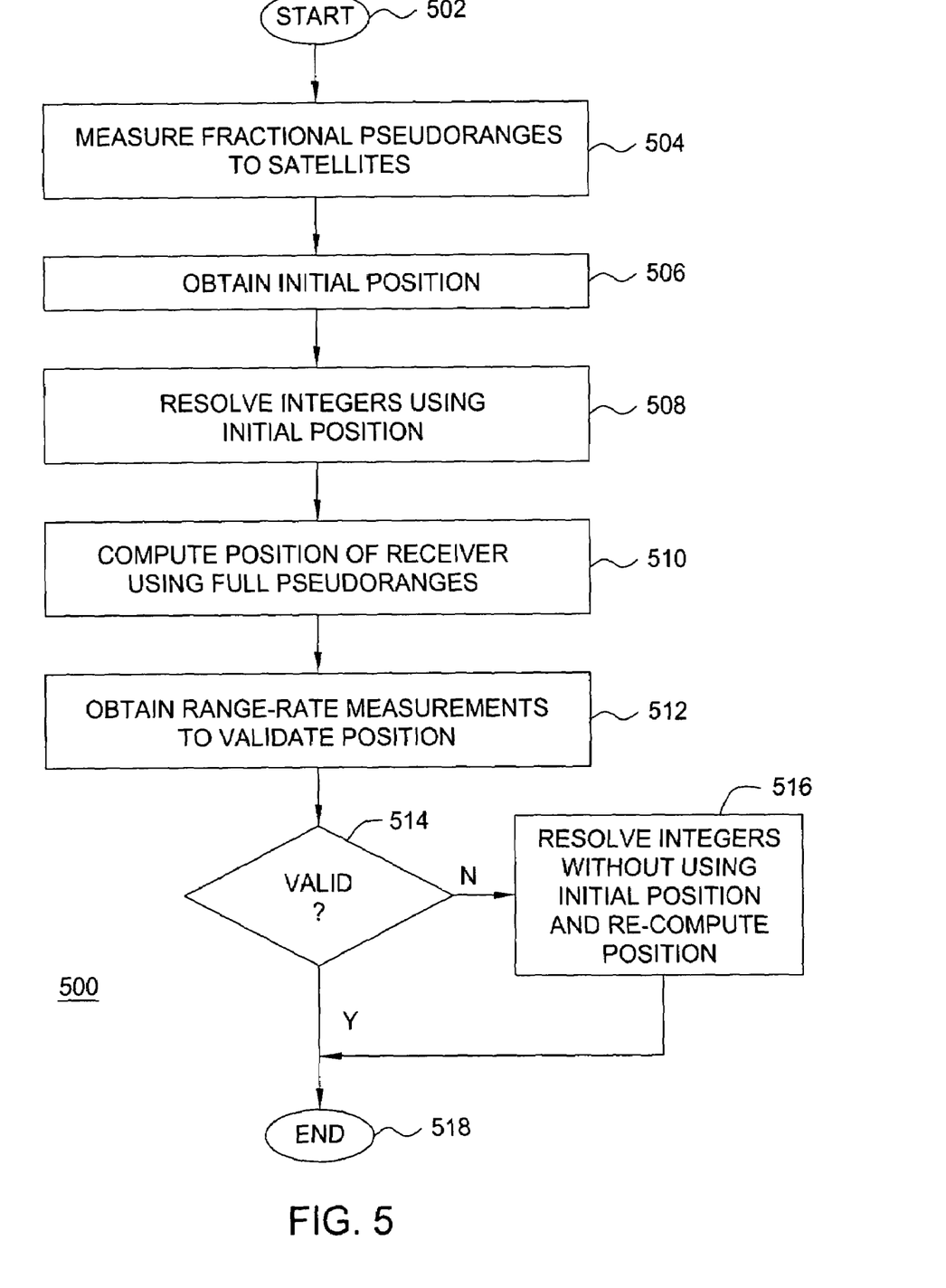
FIG. 5 is a flow diagram depicting another exemplary embodiment of a method 500 for locating position of a remote receiver in accordance with the invention.

FIG. 5 is a flow diagram depicting another exemplary embodiment of a method 500 for locating position of a remote receiver in accordance with the invention. The method 500 begins at step 502. At step 504, fractional pseudoranges are measured from the remote receiver 102 to a plurality of satellites (e.g., sub-millisecond pseudoranges, modulo-20 millisecond pseudoranges). At step 506, an initial position of the remote receiver 102 is obtained (e.g., a position from a position cache). At step 508, the pseudorange integers are resolved using the initial position. At step 510, position of the remote receiver 102 is computed using the full pseudoranges and a navigation model as described above. At step 512, range-rate measurements are obtained at the remote receiver 102 to validate the position computed at step 510. Exemplary processes for validating a position using range-rate measurements are described below with respect to FIGS. 3 and 4. At step 514, a determination is made as to whether the computed position is valid. If so, the method 500 ends at step 518. Otherwise, the method 500 proceeds to step 516. At step 516, the pseudorange integers are resolved without using the initial position and the position of the remote receiver 102 is re-computed using the pseudoranges. The method 500 then ends at step 518.

Figure 3:
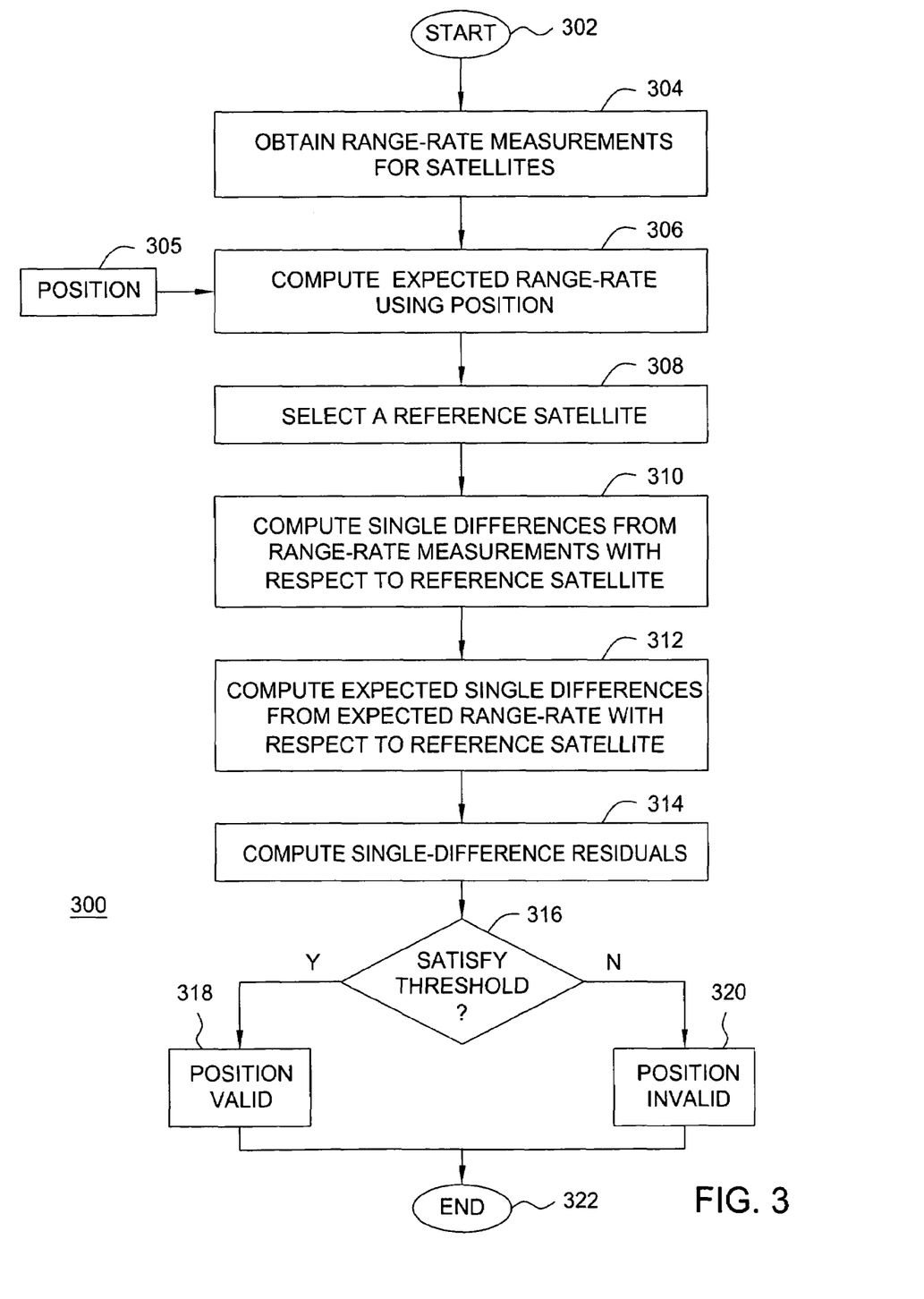
FIG. 3 is a flow diagram depicting an exemplary embodiment of a method for validating an initial position at a remote receiver in accordance with the invention.

FIG. 3 is a flow diagram depicting an exemplary embodiment of a method 300 for validating a position at a remote receiver in accordance with the invention. The method 300 may be performed at step 208 of the position location method 200 of FIG. 2 to validate an initial position and at step 512 of the position location method of FIG. 5 to validate a computed position. The method 300 begins at step 302. At step 304, range-rate measurements are obtained at the remote receiver 102 with respect to the satellites 112. The range-rate for a given satellite j is denoted as $\dot{\rho}_j$. In one embodiment of the invention, the range-rate measurements may be obtained by obtaining Doppler measurements with respect to the satellites 112. Doppler measurements may be made by the satellite signal receiver 104 in a well-known manner. Alternatively, the range-rate measurements may be obtained by differencing sets of fractional pseudoranges measured at two different times (i.e., by computing the rate-of-change of pseudoranges or the "pseudorange rate").

At step 306, expected range rates are computed using a position obtained at step 305. For example, the position obtained at step 305 may be the initial position obtained at step 206 in FIG. 2 or the computed position obtained at step 510 in FIG. 5. The expected range rates may be computed by differencing sets of expected pseudoranges to the satellites 112 based on the obtained position at two different times. The expected range-rate for a given satellite j, computed at an initial position $P_i$, is denoted as $\rho_j^i$. At step 308, a reference satellite is selected from the satellites 112 to be used in single-difference computations. In one embodiment, the satellite with the largest signal-to-noise ratio is selected as the reference satellite. The subscript 0 is used to denote a reference range-rate measurement and a reference expected range-rate. Thus, the reference range-rate measurement is denoted as $\rho_0$, and the reference expected range-rate is denoted as $\rho_0^i$.

At step 310, single differences are computed between the range-rate measurement of the reference satellite and the remaining range-rate measurements. The single difference term is denoted by the delta symbol (Δ) and is used below to signify the difference between $\rho_j$, which is the jth range-rate measurement, and $\rho_0$, which is the range-rate measurement for the reference satellite. Thus, the measured range-rate single difference for the jth satellite may be expressed as:

$$\Delta\rho_j = \rho_j - \rho_0.$$

At step 312, single differences are computed between the expected range-rate of the reference satellite and the remaining expected range-rates. The expected range-rate single difference for the jth satellite may be expressed as:

$$\Delta\rho_j^i = \rho_j^i - \rho_0^i.$$

At step 314, single-difference residuals are computed. The single difference residual for the jth satellite ($d_j$) may be expressed as:

$$d_j = \Delta\rho_j - \Delta\rho_j^i$$

At step 316, each single difference residual is compared to a threshold value and a determination is made as to whether each of the single difference residuals satisfies the threshold. In one embodiment, the absolute value of each single difference residual (having units of meters per second) is compared to a threshold. For example, a threshold of 20 meters per second (m/s) may be established, which corresponds to an approximate 100 km difference between actual position and the initial position. If the absolute value of a selected number (e.g., at least one) of the single difference residuals is greater than the threshold (e.g., 20 m/s), then the position is deemed invalid. Conversely, if the absolute value of a selected number (e.g., all) of single difference residuals is less than the threshold, then the position is deemed valid. Also, there may be an unexpected bias in each range-rate measurement if the remote receiver is moving. A threshold value of 20 m/s corresponds to a speed of approximately 72 km/h. Thus, if the speed of the remote receiver 102 is unknown by more than 72 km/h, then the results of the test performed at step 316 will be ambiguous (e.g., the initial position may be valid, but a false alarm is generated due to the unknown speed of the remote receiver 102.) In this case the problem is solved by re-computing speed using the range-rate measurements until speed is known to better than 20 m/s. It is to be understood that other threshold values may be chosen that are less or more restrictive than 20 m/s.

If the single difference residuals satisfy the threshold at step 316, the method 300 proceeds to step 318, where the position is flagged as being valid. If the single difference residuals fail the threshold, the method 300 proceeds to step 320, where the position is flagged as being invalid. The method 300 ends at step 322.

FIG. 4 is a flow diagram depicting another exemplary embodiment of a method 400 for validating a position at a remote receiver in accordance with the invention. The method 400 may be performed at step 208 of the position location method 200 of FIG. 2 to validate an initial position and at step 512 of the position location method 500 of FIG. 5 to validate a computed position. The method 400 begins at step 402. At step 404, range-rate measurements are obtained at the remote receiver 102 with respect to the satellites 112. As described above, the range rates may be obtained by obtaining Doppler measurements or by measuring the pseudorange rate. At step 410, expected range-rates are computed using a position obtained at step 406 and clock error data obtained at step 408. For example, the position obtained at step 406 may be the initial position obtained at step 206 in FIG. 2 or the computed position obtained at step 510 in FIG. 5. The clock error data obtained at step 408 includes the relative clock error difference between the clock frequency in the satellite signal receiver 104 and the clock frequency in the satellites 112. The clock error data may be known at the remote receiver 102 from a previously computed valid position and velocity.

At step 412, range-rate residuals are computed by differencing the expected range-rates computed at step 410 and the measured range-rates obtained at step 404. Since the clock error is known, the single difference computation performed in the method 300 of FIG. 3 is not necessary. At step 414, each range-rate residual is compared to a threshold value and a determination is made as to whether each of the range-rate residuals satisfies the threshold. In one embodiment, the absolute value of each range-rate residual (having units of meters per second) is compared to a threshold. If the absolute value of a selected number (e.g., at least one) of the range-rate residuals is greater than the threshold, then the position is deemed invalid. Conversely, if the absolute value of a selected number (e.g., all) of range-rate residuals is less than the threshold, then the position is deemed valid. If the range-rate residuals satisfy the threshold at step 414, the method 400 proceeds to step 416, where the position is flagged as being valid. Otherwise, the method 400 proceeds to step 418, where the position is flagged as being invalid. The method 400 ends at step 420.

In the preceding discussion, the invention has been described with reference to application upon the United States Global Positioning System (GPS). It should be evident, however, that these methods are equally applicable to similar satellite systems, and in particular, the Russian GLONASS system, the European GALILEO system, combinations of these systems with one another, and combinations of these systems and other satellites providing similar signals, such as the wide area augmentation system (WAAS) and SBAS that provide GPS-like signals. The term "GPS" used herein includes such alternative satellite positioning systems, including the Russian GLONASS system, the European GALILEO system, the WAAS system, and the SBAS system, as well as combinations thereof.

While the foregoing is directed to illustrative embodiments of the present invention, other and further embodiments of the invention may be devised without departing from the basic scope thereof, and the scope thereof is determined by the claims that follow.

What is claimed is:

1. A method of locating position of a remote receiver, comprising:
    measuring fractional pseudoranges from said remote receiver to a plurality of satellites;
    obtaining an initial position at said remote receiver;
    determining whether the initial position is valid by obtaining range-rate measurements at said remote receiver with respect to said plurality of satellites; and
    computing position of said remote receiver using the fractional pseudoranges and said initial position if said initial position is valid;
    computing position of said remote receiver using the fractional pseudoranges to the plurality of satellites and another fractional pseudorange to another satellite if said initial position is not valid.

2. The method of claim 1, wherein said initial position is obtained from a memory in said remote receiver having at least one recently computed position stored therein.

3. The method of claim 1, wherein said step of obtaining range-rate measurements comprises:
    obtaining Doppler measurements with respect to said plurality of satellites.

4. The method of claim 1, wherein said step of obtaining range-rate measurements comprises:
    measuring additional fractional pseudoranges from said remote receiver to said plurality of satellites at another time; and
    differencing said fractional pseudoranges and said additional fractional pseudoranges to produce said range-rate measurements.

5. The method of claim 1, wherein said step of validating comprises:
    computing expected range-rates with respect to said plurality of satellites using said position;
    computing single differences using said range-rate measurements;
    computing expected single differences using said expected range-rates;
    computing single difference residuals between said single differences and said expected single differences; and
    comparing said single difference residuals to a threshold.

6. The method of claim 5, wherein said step of comparing comprises:
    determining whether an absolute value of each of said single difference residuals satisfies said threshold.

7. The method of claim 6, further comprising:
    indicating validity of said position in response to the absolute value of each of said single difference residuals being less than said threshold; and
    indicating invalidity of said position in response to the absolute value at least one of said single difference residuals being greater than said threshold.

8. The method of claim 5, wherein said steps of computing said single differences and computing said expected signal differences comprise:
    selecting a reference satellite from said plurality of satellites, said reference satellite having an associated reference range-rate measurement and reference expected range-rate in said range-rate measurements and said reference range-rates, respectively;
    differencing said reference range-rate measurement and each remaining one of said range-rate measurements to compute said single differences; and
    differencing said reference expected range-rate and each remaining one of said expected range-rates to compute said expected single differences.

9. The method of claim 8, wherein a signal-to-noise ratio at said remote receiver of said reference satellite is larger than a signal-to-noise ratio of each remaining satellite in said plurality of satellites.

10. The method of claim 1, wherein said step of validating comprises:
    computing expected range-rates with respect to said plurality of satellites using said position and clock error data;
    computing range-rate residuals between said range-rate measurements and said expected range-rates; and
    comparing said range-rate residuals to a threshold.

11. The method of claim 10, wherein said step of comparing comprises:
    determining whether an absolute value of each of said range-rate residuals satisfies said threshold.

12. The method of claim 11, further comprising:
    indicating validity of said position in response to the absolute value of each of said range-rate residuals being less than said threshold; and
    indicating invalidity of said position in response to the absolute value at least one of said range-rate residuals being greater than said threshold.

13. The method of claim 1, wherein said step of computing said position comprises: fixing integer portions of said fractional pseudoranges using said initial position.

14. A method of locating position of a remote receiver, comprising:
    measuring fractional pseudoranges from said remote receiver to a plurality of satellites;
    obtaining an initial position at said remote receiver;
    obtaining range-rate measurements at said remote receiver with respect to said plurality of satellites;
    validating said initial position using said range-rate measurements; and
    computing position of said remote receiver using said fractional pseudoranges and said initial position in response to said initial position being deemed valid; and
    computing position of said remote receiver using the fractional pseudoranges to the plurality of satellites and another fractional pseudorange to another satellite if said initial position is not valid.

15. The method of claim 14, wherein said initial position is obtained from a memory in said remote receiver having at least one recently computed position stored therein.

16. The method of claim 14, wherein said step of obtaining range-rate measurements comprises:
    obtaining Doppler measurements with respect to said plurality of satellites.

17. The method of claim 14, wherein said step of obtaining range-rate measurements comprises:
    measuring additional fractional pseudoranges from said remote receiver to said plurality of satellites at another time; and
    differencing said fractional pseudoranges and said additional fractional pseudoranges to produce said range-rate measurements.

18. The method of claim 14, wherein said step of validating comprises:
    computing expected range-rates with respect to said plurality of satellites using said initial position;

computing single differences using said range-rate measurements;

computing expected single differences using said expected range-rates;

computing single difference residuals between said single differences and said expected single differences; and comparing said single difference residuals to a threshold.

19. The method of claim 18, wherein said step of comparing comprises:

determining whether an absolute value of each of said single difference residuals satisfies said threshold.

20. The method of claim 19, further comprising:

indicating validity of said initial position in response to the absolute value of each of said single difference residuals being less than said threshold; and indicating invalidity of said initial position in response to the absolute value at least one of said single difference residuals being greater than said threshold.

21. The method of claim 18, wherein said steps of computing said single differences and computing said expected signal differences comprise:

selecting a reference satellite from said plurality of satellites, said reference satellite having an associated reference range-rate measurement and reference expected range-rate in said range-rate measurements and said reference range-rates, respectively;

differencing said reference range-rate measurement and each remaining one of said range-rate measurements to compute said single differences; and differencing said reference expected range-rate and each remaining one of said expected range-rates to compute said expected single differences.

22. The method of claim 21, wherein a signal-to-noise ratio at said remote receiver of said reference satellite is larger than a signal-to-noise ratio of each remaining satellite in said plurality of satellites.

23. The method of claim 14, wherein said step of validating comprises:

computing expected range-rates with respect to said plurality of satellites using said initial position and clock error data;

computing range-rate residuals between said range-rate measurements and said expected range-rates; and comparing said range-rate residuals to a threshold.

24. The method of claim 23, wherein said step of comparing comprises:

determining whether an absolute value of each of said range-rate residuals satisfies said threshold.

25. The method of claim 24, further comprising:

indicating validity of said initial position in response to the absolute value of each of said range-rate residuals being less than said threshold; and indicating invalidity of said initial position in response to the absolute value at least one of said range-rate residuals being greater than said threshold.

26. The method of claim 14, wherein said step of computing said position comprises:

fixing integer portions of said fractional pseudoranges using said initial position.

27. Apparatus for locating position, comprising:

a satellite signal receiver for measuring fractional pseudoranges to a plurality of satellites and for obtaining range-rate measurements with respect to said plurality of satellites;

a memory for storing an initial position; and a processor for computing position using said fractional pseudoranges and said initial position and for validating said position using said range-rate measurements; and computing position of said remote receiver using the fractional pseudoranges to the plurality of satellites and another fractional pseudorange to another satellite if said initial position is not valid.

* * * * *